Feb. 8, 1927.
G. R. McDONALD
REGULATING SYSTEM
Filed March 23 1926
1,617,130
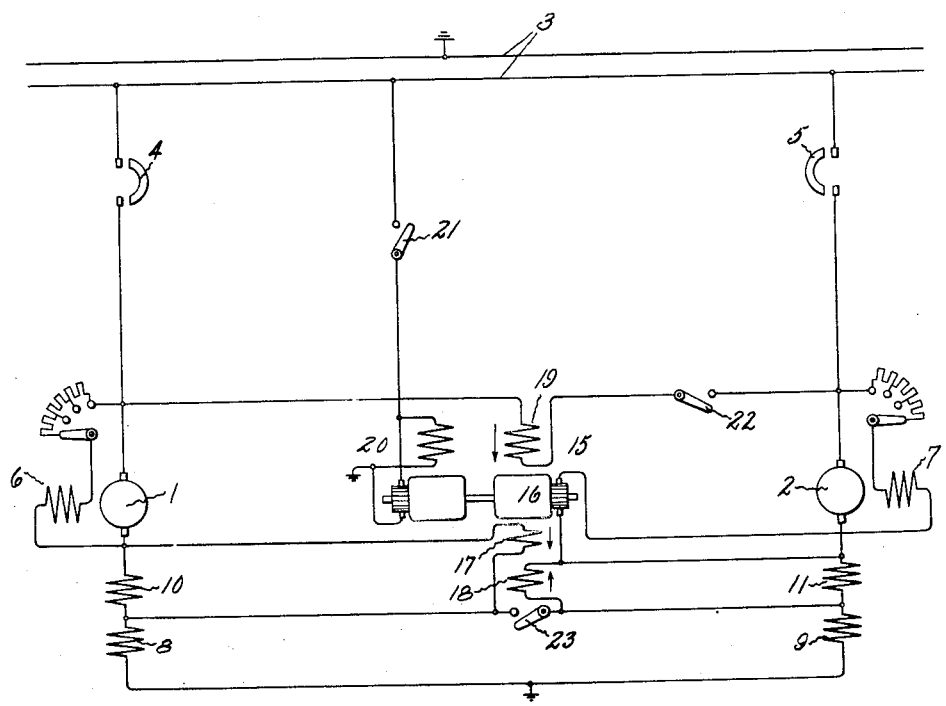
Inventor:
Gordon R. McDonald,
by Alexander F. [illegible]
His Attorney.

Patented Feb. 8, 1927.

1,617,130

UNITED STATES PATENT OFFICE.

GORDON R. McDONALD, OF SCHENECTADY, NEW YORK, ASSIGNOR TO GENERAL ELECTRIC COMPANY, A CORPORATION OF NEW YORK.

REGULATING SYSTEM.

Application filed March 23, 1926. Serial No. 96,850.

My invention relates to regulating systems and particularly to regulating systems for controlling the division of load between two sources of current and its object is to provide an improved system for accomplishing this result.

My invention is particularly designed for use in controlling the division of the load between a plurality of overcompound generators connected in parallel.

My invention will be better understood from the following description, taken in connection with the accompanying drawing, and its scope will be pointed out in the appended claims.

Referring to the accompanying drawing, which is a diagram showing one embodiment of my invention, 1 and 2 represent two sources of current, shown as compound direct current generators, which are adapted to be connected to a load circuit 3 by circuit breakers 4 and 5 respectively, which may be of any suitable type, examples of which are well known in the art.

The generators 1 and 2 are provided respectively with the shunt field windings 6 and 7, series field windings 8 and 9, and series commutating field windings 10 and 11.

As is well known in the art, it is difficult to maintain proper division of the load between two overcompound generators in parallel without some kind of a regulating arrangement being provided to control the voltage of one or both of the generators. In accordance with my improved regulating arrangement, I provide an auxiliary dynamo electric machine 15 which comprises an armature 16 which is connected in series with the shunt field winding 7 of the generator 2, a field winding 17 which is connected in parallel with the commutating field winding 10 of generator 1, and a field winding 18 which is connected in parallel with the commutating field winding 11 of generator 2. The windings 17 and 18, therefore, are respectively energized in accordance with the current outputs of the generators 1 and 2. These windings 17 and 18 are wound differentially with respect to each other and are so arranged that when the excitation of the winding 17 predominates, a voltage is induced in the armature winding 16 in such a direction that the machine 15 acts as a booster in the shunt field circuit of the generator 2 and increases the output of the generator 2. When the excitation of the winding 18 predominates, a voltage is induced in the armature winding 16 in such a direction that the machine 15 acts as a bucker in the shunt field circuit of the generator 2 and decreases the output of the generator 2.

The auxiliary machine 15 may also be provided with another field winding 19 which is arranged to be connected so that it is energized in response to the difference between the voltages of the two machines. This winding is used to help equalize the voltages of the two generators before generator 2 is connected to the load circuit.

The auxiliary machine 15 may be driven by any suitable means, examples of which are well known in the art. As shown in the drawing, a shunt motor 20, which is arranged to be supplied from the load circuit 3, is provided for driving the machine 15.

21, 22 and 23 are suitable switches for respectively controlling the operation of the motor 20, the energization of the field winding 19 and an equalizer connection between the two series field windings 8 and 9 of the generator 1 and 2. These switches may be either manually or automatically controlled in a manner well known in the art.

The operation of the system shown in the drawing is as follows:—When it is desired to operate the two generators in parallel, the generator 1 is first connected to the load circuit. After the generator 2 is started, the switches 21, 22 and 23 are closed so that my improved regulating means operates to equalize the voltages of the two generators although the generator 2 is still disconnected from the load circuit. The closing of the switch 21 completes the circuit of the driving motor 20. The closing of the switch 22 completes the circuit of the field winding 19 and the closing of the switch 23 completes the equalizer connection. Since the overcompound generator 1 is carrying load and the generator 2 is not, the voltage of the generator 1 and load circuit 3 is higher than the no load voltage of the generator 2. As it is desirable to have the voltage of the generator 2 equal to or slightly higher than the load circuit voltage at the instant of closing the circuit breaker 5, the field winding 19 is provided to help increase the voltage of the generator 2 the necessary amount to accomplish this result. It will be observed that when the voltage of the generator 1 is higher than the voltage of generator 2, current flows through the winding 19, and as mentioned above, the direction of this current is such that it induces a voltage in the armture 16 which tends to increase the excitation and no load voltage of the generator 2.

At this time the differential field winding 17 predominates over the field winding 18 since generator 2 is supplying no load current. Windings 17 and 19, therefore, act accumulatively to induce a voltage in the armature 16 which is in a direction to increase the excitation and voltage of the generator 2.

When the voltage of the generator is at a predetermined value, circuit breaker 5 is closed to connect the generator 2 across the load circuit 3. After the circuit breaker 5 is closed no current flows through the field winding 19 because the same voltage is impressed upon both of its terminals. The proper load division is maintained by causing the voltage induced in the armature 16 to vary the shunt field circuit of the generator 2.

If the generator 2 is carrying more than its share of the total load on the two generators, the excitation of the field winding 18 of the machine 15 predominates so that the machine 15 acts as a bucker and decreases the field current of the generator 2. If the generator 2 is not carrying its share of the total load, the excitation of the field winding 17 predominates so that the machine 15 acts as a booster and increases the field current of the generator 2.

In order to provide proper damping and to stabilize the parallel operation of the generators, it is preferable to use an auxiliary machine 15 which has a comparatively high voltage armature and solid field poles which have a large residual so that the machine still produces a corrective effect after the loads are balanced and the ampere turns of the two differential windings 17 and 18 are substantially equal.

While I have, in accordance with the patent statutes, shown and described my invention as applied to a particular arrangement embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:—

1. In combination, two sources of current connected in parallel, one of said sources being a dynamo electric machine and means for balancing the load between said sources comprising another dynamo electric machine connected in the field circuit of the first mentioned dynamo electric machine, and means for exciting said second mentioned dynamo electric machine in accordance with the relative current outputs of the two sources.

2. In combination, two dynamo electric machines connected in parallel, and means for balancing the load between said machines comprising an auxiliary dynamo electric machine connected in the field circuit of one of said two dynamo electric machines, and means for exciting said auxiliary dynamo electric machine in accordance with the difference between the loads on the two machines.

3. In combination, two dynamo electric machines connected in parallel, and means for balancing the load between said machines comprising an auxiliary dynamo electric machine connected in the field circuit of one of said two dynamo electric machines, and two differentially wound field windings for said auxiliary machine, one of said field windings being connected so as to be energized in accordance with the load on one of said two machines and the other of said field windings being connected so as to be energized in accordance with the load on the other of said two machines.

4. In combination, two sources of direct current connected in parallel, one of said sources being a generator having a shunt field winding, a dynamo electric machine comprising an armature connected in the shunt field circuit of said generator and two differential field windings, one of said differential field windings being responsive to the current output of one of said sources and the other one being responsive to the current output of the other of said sources.

5. In combination, two sources of direct current adapted to be connected in parallel, one of said sources being a dynamo electric machine having a field winding, and an auxiliary dynamo electric machine comprising an armature connected in the field circuit of said first mentioned dynamo electric machine, a field winding responsive to the difference in the voltages of the two sources, and means for exciting said auxiliary machine in accordance with the relative outputs of the two sources.

6. In combination, two generators adapted to be connected in parallel, a field winding for one of said generators, and a dynamo electric machine comprising an armature connected in the circuit of said generator field winding, a field winding connected so as to be responsive to the difference between the voltages of the two generators, and two differentially wound field windings, one of which is connected so as to be responsive to the current output of one of said generators and the other of which is connected so as to be responsive to the current output of the other generator.

7. In combination, two overcompound direct current generators adapted to be connected in parallel, and a dynamo electric machine comprising an armature connected in the shunt field circuit of one of said generators, a field winding connected in parallel with a series winding of one of said generators, another field winding connected in parallel with a series winding of the other generator, and a third field winding connected across corresponding terminals of said generators whereby said last mentioned winding is energized in response to the difference in voltage between said generators.

8. In combination, two overcompound direct current generators adapted to be connected in parallel, and a dynamo electric machine comprising an armature connected in the shunt field circuit of one of said generators, a field winding connected in parallel with a series winding of said one of said generators, another field winding wound differentially with respect to said first mentioned field winding and connected in parallel with a series winding of the other generator, and a third winding connected so as to be energized in accordance with the difference between the voltage of said generators and arranged to act accumulatively with said second mentioned field winding when the voltage of said other generator exceeds the voltage of said one of said generators.

In witness whereof, I have hereunto set my hand this 22nd day of March, 1926.

GORDON R. McDONALD.